Aug. 14, 1945.    J. BOLSEY    2,381,997
EDITING TABLE
Filed March 13, 1944    3 Sheets-Sheet 1

INVENTOR.
JACQUES BOLSEY
BY
his agent

Aug. 14, 1945.   J. BOLSEY   2,381,997
EDITING TABLE
Filed March 13, 1944   3 Sheets-Sheet 2

INVENTOR.
JACQUES BOLSEY
BY *Michael S. Johnson*
  his agent

Aug. 14, 1945.                J. BOLSEY                2,381,997
                             EDITING TABLE
                    Filed March 13, 1944        3 Sheets-Sheet 3

INVENTOR.
JACQUES BOLSEY
BY

Patented Aug. 14, 1945

2,381,997

UNITED STATES PATENT OFFICE 2,381,997

EDITING TABLE

Jacques Bolsey, New York, N. Y.

Application March 13, 1944, Serial No. 526,234

10 Claims. (Cl. 88—24)

My present invention relates to film viewing devices and particularly to film viewing devices built into film editing units.

It is an object of my present invention to provide a film viewing device of especially simple and efficient design.

It is a further object of my invention to arrange the various parts of a film editing unit, e. g. a film editing table in such a manner that the same could be easily operated.

Still a further object of the invention is a film viewing device in which the casing supporting the parts of the device is in itself a useful part of the same.

Another object of my present invention consists in combining the film winding mechanism and the film viewing device in one and the same casing.

Still another object of my invention consists of a viewing device combined with means for producing photographic enlargements.

With the above objects in view, my present invention mainly consists of a film viewing device comprising in combination a casing closed substantially at all sides, motion picture projection means arranged on the top of this casing, an opening in the top of the casing, light-reflecting means arranged on the top of the casing in such a manner as to direct the projected motion pictures through this opening into the interior of the above mentioned casing, a projecting screen forming a part of the top or another wall of the casing, and light-reflecting means arranged in the interior of the casing in such a manner as to reflect the projected motion pictures onto said screen.

In accordance with a preferred embodiment of my invention, the motion picture projecting means used by me comprise film transporting means adapted to transport a film strip with uniform speed on the top of the casing, a light source adapted to direct a light beam through a film strip while transported by these film transporting means, an opening in the top of this casing, light-reflecting means arranged in such a manner as to direct the light beam after having passed through the film strip through the above mentioned opening into the interior of the casing, optical compensating means arranged in the path of the light beam after the same has passed through said film strip, and means for rotating these optical compensating means in timed relation with the movement of the film strip.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a top view of one embodiment of a film editing unit according to my present invention;

Fig. 2 is a cross-section of the film editing unit shown in Fig. 1, along line 2—2;

Figure 3:
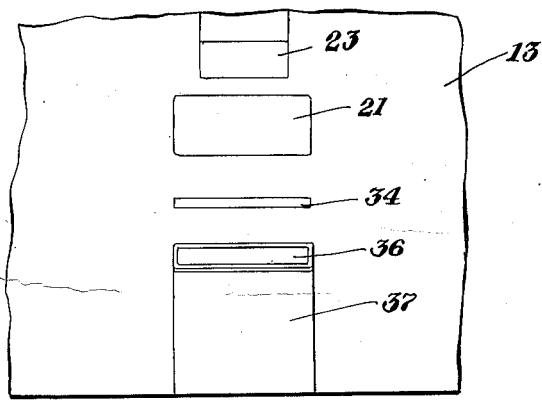
Fig. 3 is a top view of another embodiment of my new film editing unit.

As shown in all the figures, my new film editing unit comprises a film viewing device 10 and film winding means 11 and 12. This film viewing device and the film winding means 11 and 12 are mounted partly on and partly in the casing 13; this casing is closed substantially at all sides, forming thereby a dark chamber, shown in cross section in Figs. 2, 4, 6 and 7.

The film viewing device itself comprises optical compensating means, e. g. a rotatably supported compensating prism 14, a lens 17 and means for supplying a beam of light to said prism, e. g. an electric light source 15 and condenser 16. The above mentioned film winding means 11 and 12 serve for moving a film strip with uniform speed across the light beam emitted by light source 15.

A film gate 17 provided with an aperture and a sprocket 18, cooperating with the counter 19 and driving the prism 14, form also part of the viewing device. As shown in the drawings, I may also provide film cleaning means 20 in the path of the film, and also arrange a film splicing device 21 on the top of casing 13.

Figure 4:
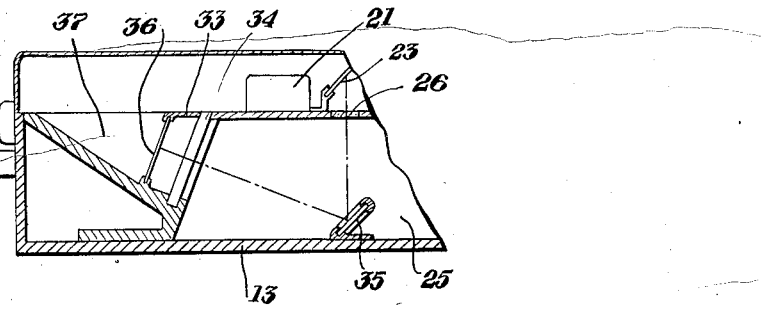
Fig. 4 is a cross-section of the unit shown in Fig. 3, along line 4—4.

The light beam 22 emitted by light source 15 passes the condenser 16, film gate 17, the rotating compensating prism 14 and lens 17; then it strikes the reflecting mirror 23. Due to the inclined position of this mirror, the light beam is reflected through opening 24 into the interior of casing 13. As mentioned above, casing 13 is closed substantially at all sides and thereby forms a dark chamber 25. As shown in Fig. 4, it is not necessary to provide an opening 24, but I may use a light-transmitting top portion, e. g. a transparent glass plate 26, instead of opening 24.

In the embodiments shown in Figs. 1 and 2, the light beam 22 entering the dark chamber 25 is reflected in the same by a reflecting optical system consisting of the mirrors 27, 28, and 29. These mirrors are arranged in such a manner that the enlarged film picture is reflected onto the projection screen 30, forming a part of the top of the casing and being arranged at a certain distance from opening 24; I wish to note that screen 30 also may form a part of another wall, e. g. of front wall 31 of casing 13, instead of being arranged on the casing top.

In accordance with my present invention, near to screen 30 I provide supporting means 32 for a magazine containing light-sensitive photographic films or plates adapted to be exposed. These supporting means 32 are arranged within the casing 13 between the reflecting mirror 29 and screen 30, substantially parallel to the latter. In the casing top 33, a slot 34 is provided for sliding the film or plate magazine into the casing where it is then carried by the supporting means 32. Thus, not only may I use my new film viewing device for observing the enlarged film picture, but also for making photographic enlargements of the same.

The embodiments shown in Figs. 3, 4, and 5, 6, respectively, are similar to those shown in Figs. 1 and 2. They differ only in the arrangement of the light-reflecting means, i. e. mirrors and prisms, and in the arrangement of the screen onto which the enlarged pictures are projected.

Thus, in the embodiments shown in Figs. 3 and 4, I provide in the dark chamber 25 within casing 13 only one reflecting mirror 35 and arrange screen 36 within a recess 37 of the casing top 33. By adequate shape of recess 37 and position of screen 36, observation of the projected and enlarged image on screen 36 may be facilitated.

Figure 5:
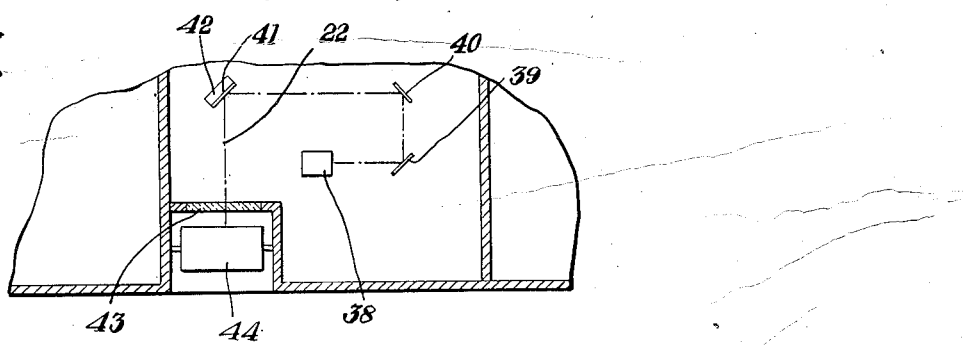
Fig. 5 is a cross-section of a further embodiment of the new editing unit along line 5—5 of Fig. 6.
Figure 6:
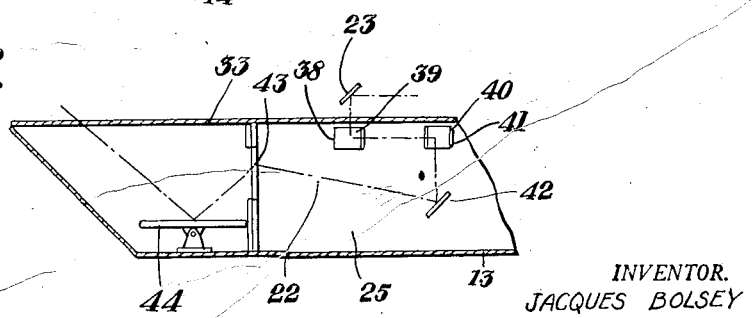
Fig. 6 is a cross-section of the unit shown in Fig. 5, along line 6—6 of this figure.

In the embodiment shown in Figs. 5 and 6, I provide a great number of reflecting mirrors and prisms in order to conveniently reverse the image and to lengthen the path of the light beam 22 as much as possible. This is of advantage in order to obtain satisfactory enlargement of the projected picture. For this purpose, I provide besides the reflecting mirror 23 arranged on top 33 of casing 13, an additional set of reflecting mirrors 38, 39, 40, 41, and 42; these reflecting mirrors are arranged in the dark chamber 25 within casing 13. The light beam 22 reflected by mirror 42 strikes screen 43; the latter is arranged normal to casing top 33.

In order to enable observation of the projected enlarged picture appearing on screen 43, I provide the tiltable mirror 44 within recess 45; tilting of mirror 44 enables observation of the projected image from various observation points.

Besides the viewing device described above in detail, my new editing table also comprises the winding means 11 and 12. Each of these winding means consists of a rotatable winding member 46 arranged normal to the casing top 33 and projecting above the same. This winding member is adapted to carry a film reel of the usual type, not shown in the drawings; if it is desired to use the film without reels, a detachable film for carrying the film may be arranged on and rotated by each of the winding members 46.

The winding members 46 are rotated by handle 47 arranged on the front wall 31 of casing 13. The winding mechanism consisting each of a shaft 48, conical gears 49 and 50, and shaft 51 carrying the winding member 46, are arranged in casing 13. Thus, the interior of this casing not only serves as dark chamber for the viewing device 10, but also contains the winding mechanisms of the winding means 11 and 12.

If desired, an electrical motor 52 for driving the winding member 46 on the right side of casing 13 may be arranged within the same.

As shown in the drawings, I prefer casing 13 to be of longitudinal shape and to arrange the viewing device 10 in the middle part and the two winding means 11 and 12 at the side parts of this longitudinal casing.

In order to protect all parts arranged on top of casing 13 from damage during transportation, I furthermore provide cover 53; this cover encloses all optical parts of the viewing device, the film cleaning and splicing means, and the film winding means, too. This cover is preferably secured to casing 13 by hinges 54 and provided with locking means 55. Furthermore, a handle 56 may be provided on the front wall 31 of the casing; this facilitates carrying of the entire editing unit. A small cover 53a, clearly shown in Fig. 2, may be provided for protection of the optical means when cover 53 is open. It is also possible, as shown in Fig. 1, to provide two buttons 59 and 60 controlling corresponding notching devices 61 which are adapted to differently notch the film in order to mark those places where the film has to be cut off or spliced for editing purposes.

Figure 7:
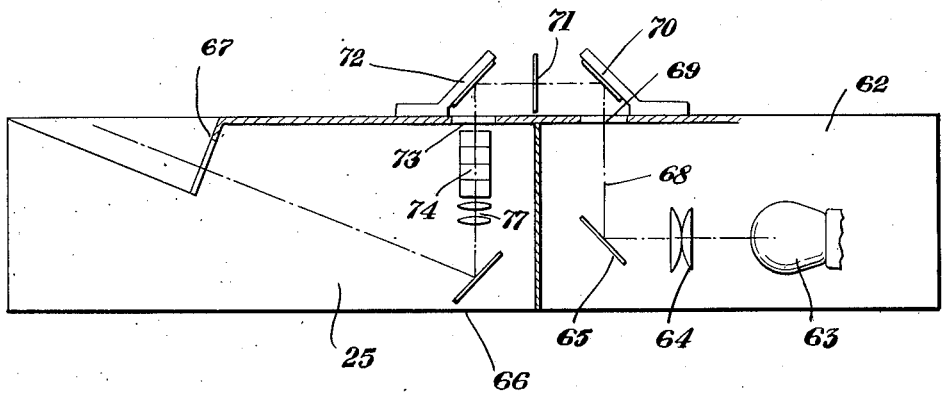
Fig. 7 is a cross-section of still a further embodiment of my new editing unit, along line 7—7 of Fig. 8.
Figure 8:
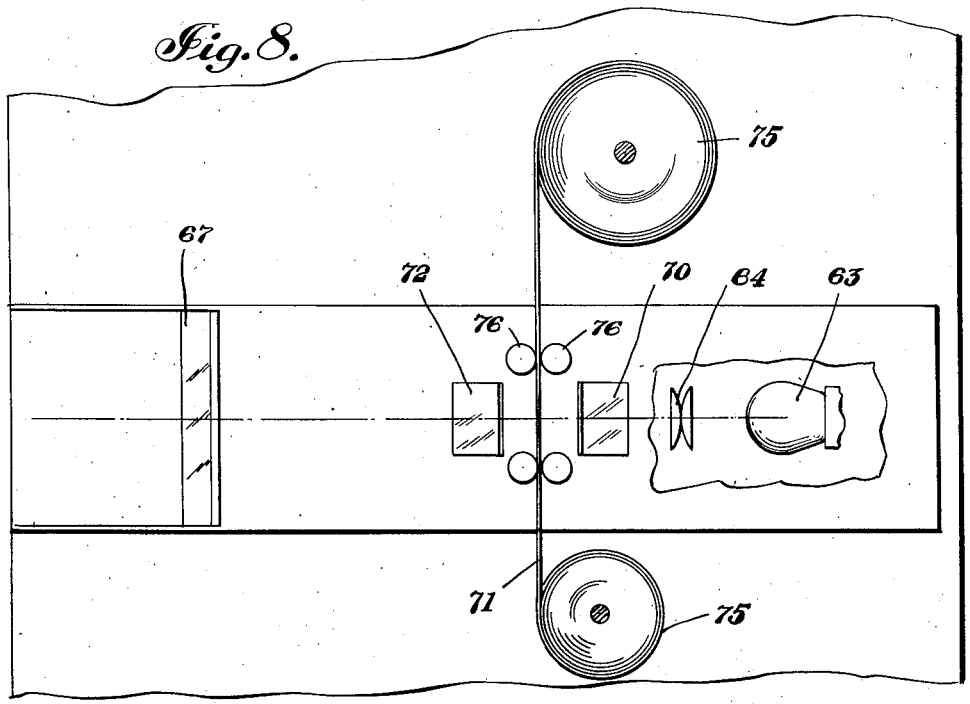
Fig. 8 is a top view, partly in section, of the unit shown in Fig. 7.

In Figs. 7 and 8 I have shown a still further embodiment of my new editing unit. This unit comprises casing 62 which is housing the light source 63, the concentrating lens 64, the deflecting mirrors 65 and 66 and the projection screen 67. Mirror 65 serves to deflect light beam 68 through opening 69 against mirror 70 which in turn deflects the light beam through film 71. The thus deflected and modulated light beam impinges upon mirror 72 and is deflected by the same through opening 73. Then, the light beam passes through the optical compensating means 74 arranged inside casing 62 and impinges upon deflecting mirror 66 which reflects it upon screen 67, as described above. It is evident that in this embodiment the entire mechanism is arranged inside the casing 62, i. e. light source, screen, and optical compensating means are inside the casing and only the deflecting mirrors 70 and 72 and the film transporting means, consisting of the disks 75 and guiding rollers 76, are arranged on the top of the casing. Of course, one or both of the horizontally arranged disks 75 may be driven so as to enable movement of the film in both directions.

I wish to note that I have shown only schematic views and cross-sections of some of the embodiments of my present invention. The not shown parts of these embodiments are the same as the corresponding parts of the embodiment shown in Figs. 1 and 2.

It will be understood that each of the elements described above, or two or more together, may also find a useful application in other types of viewing devices differing from those described above.

While I have illustrated and described the invention as embodied in editing units, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. A film viewing device comprising in combination a casing closed at least substantially at all sides, film transporting means adapted to transport a film strip with uniform speed on the top of said casing, a film gate on said top of said casing, a light source adapted to direct a light beam through said film strip while moved by said film transporting means past said film gate, an opening in the top of said casing, light reflecting means arranged on the top of said casing in such a manner as to direct said light beam after having passed through said film strip through said opening into the interior of said casing, optical compensating means arranged in the path of said light beam after the same has passed through said film strip, means for rotating said optical compensating means in timed relation with the movement of said film strip, a projection screen forming a part of the top or another wall of said casing and arranged at a certain distance from said opening, light reflecting means arranged in the interior of said casing in such a manner as to reflect the light beam entering said casing through said opening onto said screen, and supporting means for a magazine containing light-sensitive photographic films or plates adapted to be exposed, said supporting means being arranged between said light reflecting means in the interior of said casing and said screen near to the latter in such a manner as to support said magazine substantially parallel to the screen, if required.

2. A film viewing device comprising in combination a casing closed substantially at all sides, optical compensating means arranged on the top of said casing, a film gate on said top of said casing, means for supplying a beam of light to said optical compensating means, means for moving a film strip with uniform speed past said film gate across said beam of light, means for rotating said optical compensating means in timed relation with the movement of said film strip, an opening in the top of said casing, light reflecting means arranged on the top of said casing in such a manner as to direct the light beam after having passed said film and said optical compensating means through said opening into the interior of said casing, a projection screen forming a part of the top or another wall of said casing and arranged at a certain distance from said opening, light reflecting means arranged in the interior of said casing in such a manner as to reflect the light beam entering said casing through said opening onto said screen, and supporting means for a magazine containing light sensitive photographic films or plates adapted to be exposed, said supporting means being arranged within said casing between the light reflecting means arranged in said casing and said screen near to the latter in such a manner as to support said magazine substantially parallel to the screen, if required.

3. A film viewing device comprising in combination a casing closed at least substantially at all sides, film transporting means adapted to transport a film strip with uniform speed on the top of said casing, a film gate on said top of said casing, a light source adapted to direct a light beam through said film strip while moved by said film transporting means past said film gate, an opening in the top of said casing, light reflecting means arranged on the top of said casing in such a manner as to direct said light beam after having passed through said film strip through said opening into the interior of said casing, optical compensating means arranged in the path of said light beam after the same has passed through said film strip, means for rotating said optical compensating means in timed relation with the movement of said film strip, a projection screen forming a part of the top or another wall of said casing and arranged at a certain distance from said opening, light reflecting means arranged in the interior of said casing in such a manner as to reflect the light beam entering said casing through said opening onto said screen, supporting means for a magazine containing light-sensitive photographic films or plates adapted to be exposed, said supporting means being arranged within said casing between the light reflecting means arranged in said casing and said screen near to the latter in such a manner as to support said magazine substantially parallel to the screen, and a slot in the top of said casing for sliding said magazine into said casing where the same is carried by said supporting means.

4. A film view device comprising in combination a casing closed at least substantially at all sides, film transporting means adapted to transport a film strip with uniform speed on the top of said casing, a film gate on said top of said casing, a light source adapted to direct a light beam through said film strip while moved by said film transporting means past said film gate, a light transmitting portion in the top of said casing, light reflecting means arranged on the top of said casing in such a manner as to direct said light beam after having passed through said film strip through said light transmitting portion in the top of said casing into the interior of said casing, optical compensating means arranged in the path of said light beam after the same has passed through said film strip, means for rotating said optical compensating means in timed relation with the movement of said film strip, a projection screen forming a part of the top or another wall of said casing, at least two cooperating mirrors arranged in the interior of said casing in such a manner as to reflect the light beam entering said casing through said light transmitting top portion onto said screen, and supporting means for a magazine containing light-sensitive photographic films or plates adapted to be exposed, said supporting means being arranged within said casing between the light reflecting means arranged in said casing and said screen near to the latter in such a manner as to support said magazine substantially parallel to the screen, if required.

5. A film viewing device comprising in combination a casing closed at least substantially at all sides, film transporting means adapted to transport a film strip with uniform speed on the top of said casing, a film gate on said top of said casing, a light source adapted to direct a light beam through said film strip while moved by said film transporting means past said film gate, a light transmitting portion in the top of said casing, light reflecting means arranged on the top of said casing in such a manner as to direct said light beam after having passed through said film strip through said light transmitting portion in the top of said casing into the interior of said casing, optical compensating means arranged in the path of said light beam after the same has passed through said film strip, means for rotating said optical compensating means in timed relation with the movement of said film strip, a projection screen forming a part of the top or another wall of said casing, at least two cooperating mirrors arranged in the interior of said casing in such a manner as to reflect the light beam entering said casing through said light transmitting top portion onto said screen, supporting means for a magazine containing light-sensitive photographic films or plates adapted to be exposed, said supporting means being arranged within said casing between the light reflecting means arranged on said casing and said screen near to the latter in such a manner as to support said magazine substantially parallel to the screen if required, and a slot in the top of said casing for sliding said magazine into said casing where the same is carried by said supporting means.

6. A film viewing device comprising in combination a casing closed at least substantially at all sides, film transporting means adapted to transport a film strip with uniform speed on the top of said casing, a film gate on said top of said casing, a light source adapted to direct a light beam through said film strip while moved by said film transporting means past said film gate, a light transmitting portion in the top of said casing, light reflecting means arranged on the top of said casing in such a manner as to direct said light beam after having passed through said film strip through said light transmitting portion in the top of said casing into the interior of said casing, optical compensating means arranged in the path of said light beam after the same has passed through said film strip, means for rotating said optical compensating means in timed relation with the movement of said film strip, a projection screen forming a part of the casing top and arranged normal to the same within a recess in the top, a light reflecting mirror system arranged in the interior of said casing in such a manner as to reflect the light beam entering said casing through said light transmitting top portion onto said screen, and a tiltable reflecting mirror arranged within the recess of said casing top in such a manner as to reflect the enlarged film picture projected onto said screen.

7. A portable film viewing device comprising in combination a relatively flat portable casing closed on all sides and having parallel flat top and bottom walls, film transporting means adapted to transport a film strip with uniform speed mounted outside said casing on said flat top wall, a film gate on said flat top wall, a light source mounted also on said flat top wall and adapted to direct a light beam through said film strip while the same is moved by said film transporting means past said film gate, an opening in said flat top wall of said relatively flat portable casing, light reflecting means arranged on said flat top wall of said portable casing in such a manner as to direct said light beam after having passed through said film strip through said opening into the interior of said relatively flat portable casing, optical compensating means mounted near said flat top wall of said relatively flat portable casing in the path of said light beam after the same has passed through said film strip, means for rotating said optical compensating means in timed relation with the movement of said film strip, a projection screen forming part of said top wall of said relatively flat portable casing and arranged at a certain distance from said opening in said flat top wall, and light reflecting means arranged in the interior of said relatively flat portable casing near said flat bottom wall of the same in such a manner as to reflect the light beam entering said relatively flat portable casing through said opening in said flat top wall onto said screen forming part of said flat top wall.

8. A film viewing device comprising in combination a casing closed at least substantially at all sides and having a flat top wall, film transporting means adapted to move a film strip with uniform speed on said flat top wall, means for driving said film transporting means, a film gate on said flat top wall, a light source adapted to direct a light beam through said film strip while moved by said film transporting means with uniform speed on top of said flat top wall past said film gate, an opening in said flat top wall of said casing, light reflecting means arranged on said flat top wall of said casing in such a manner as to direct said light beam after having passed through said film strip through said opening into the interior of said casing, rotatable optical compensating means arranged in the path of said light beam after the same has passed through said film strip, motion transmitting means engaging said film strip and being driven by the same when said film strip is moved by said film transporting means, rotating means driven by said motion transmitting means and rotating said rotatable optical compensating means in timed relation with the movement of said film strip during movement of the same, a projection screen forming part of a wall of said casing and arranged at a certain distance from said opening in said flat top wall, and light reflecting means arranged in the interior of said casing in such a manner as to reflect the light beam entering said casing through said opening onto said screen.

9. A film viewing device comprising in combination a casing closed at least substantially at all sides and having a flat top wall, film transporting means adapted to move a film strip with uniform speed on said flat top wall, means for driving said film transporting means, a film gate on said flat top wall, a light source adapted to direct a light beam through said film strip while moved by said film transporting means with uniform speed on top of said flat top wall past said film gate, an opening in said flat top wall of said casing, light reflecting means arranged on said flat top wall of said casing in such a manner as to direct said light beam after having passed through said film strip through said opening into the interior of said casing, rotatable optical compensating means arranged in the path of said light beam after the same has passed through said film strip, motion transmitting means arranged on said flat top wall of said casing engaging said film and being driven by the same when said film strip is moved by said film transporting means, said motion transmitting means reaching into said casing, rotating means arranged within said casing and driven by said motion transmitting means and rotating said rotatable optical compensating means in timed relation with the movement of said film strip during movement of the same, a projection screen forming part of a wall of said casing and arranged at a certain distance from said opening in said flat top wall, and light reflecting means arranged in the interior of said casing in such a manner as to reflect the light beam entering said casing through said opening onto said screen.

10. A film viewing device comprising in combination a casing closed at least substantially at all sides and having a flat top wall, two film supports arranged on said flat top wall, film transporting means adapted to rotate one of said film supports and thus transport a film strip from one of said supports to the other with uniform speed on said flat top wall of said casing, means for driving said film transporting means, a film gate on said flat top wall, a light source adapted to direct a light beam through said film strip while moved by said film transporting means with uniform speed on top of said flat top wall past said film gate, an opening in said flat top wall of said casing, light reflecting means arranged on said flat top wall of said casing in such a manner as to direct said light beam after having passed through said film strip through said opening into the interior of said casing, rotatable optical compensating means arranged in the path of said light beam after the same has passed through said film strip, motion transmitting means arranged on said flat top wall of said casing engaging said film and being driven by the same when said film strip is moved by said film transporting means, said motion transmitting means reaching into said casing, rotating means arranged within said casing and driven by said motion transmitting means and rotating said rotatable optical compensating means in timed relation with the movement of said film strip during movement of the same, a projection screen forming part of a wall of said casing and arranged at a certain distance from said opening in said flat top wall, and light reflecting means arranged in the interior of said casing in such a manner as to reflect the light beam entering said casing through said opening onto said screen.

JACQUES BOLSEY.